April 16, 1940.  R. A. GOEPFRICH  2,197,721
TRANSMISSION AND CLUTCH CONTROL
Filed Oct. 1, 1937  2 Sheets-Sheet 2
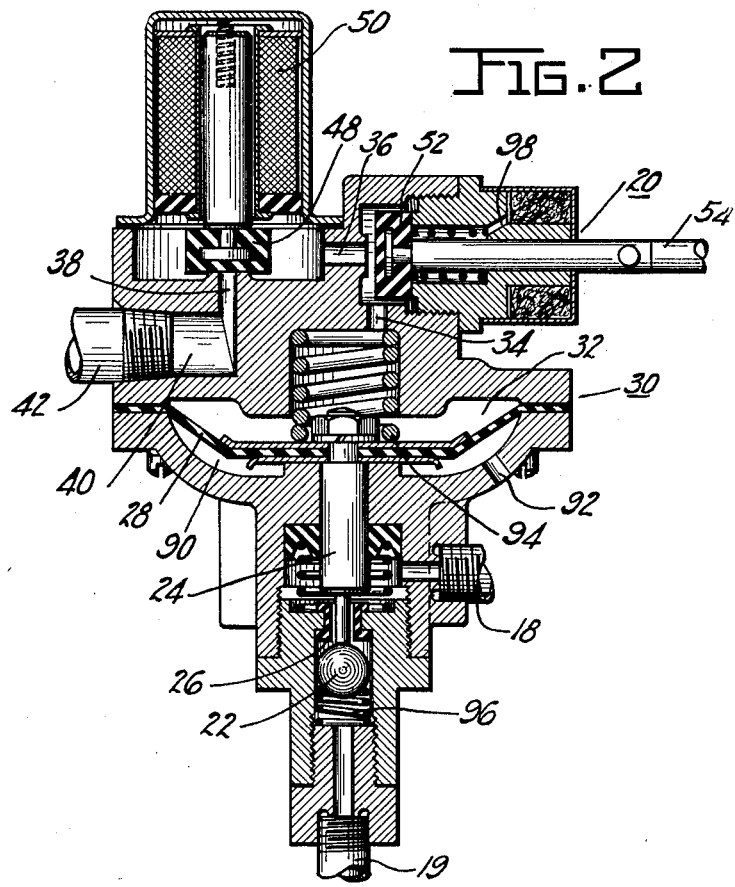
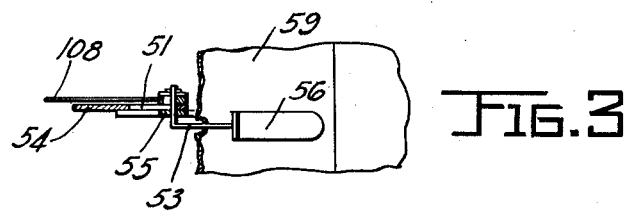
INVENTOR.
RUDOLPH A. GOEPFRICH
BY H. O. Clayton
ATTORNEY.

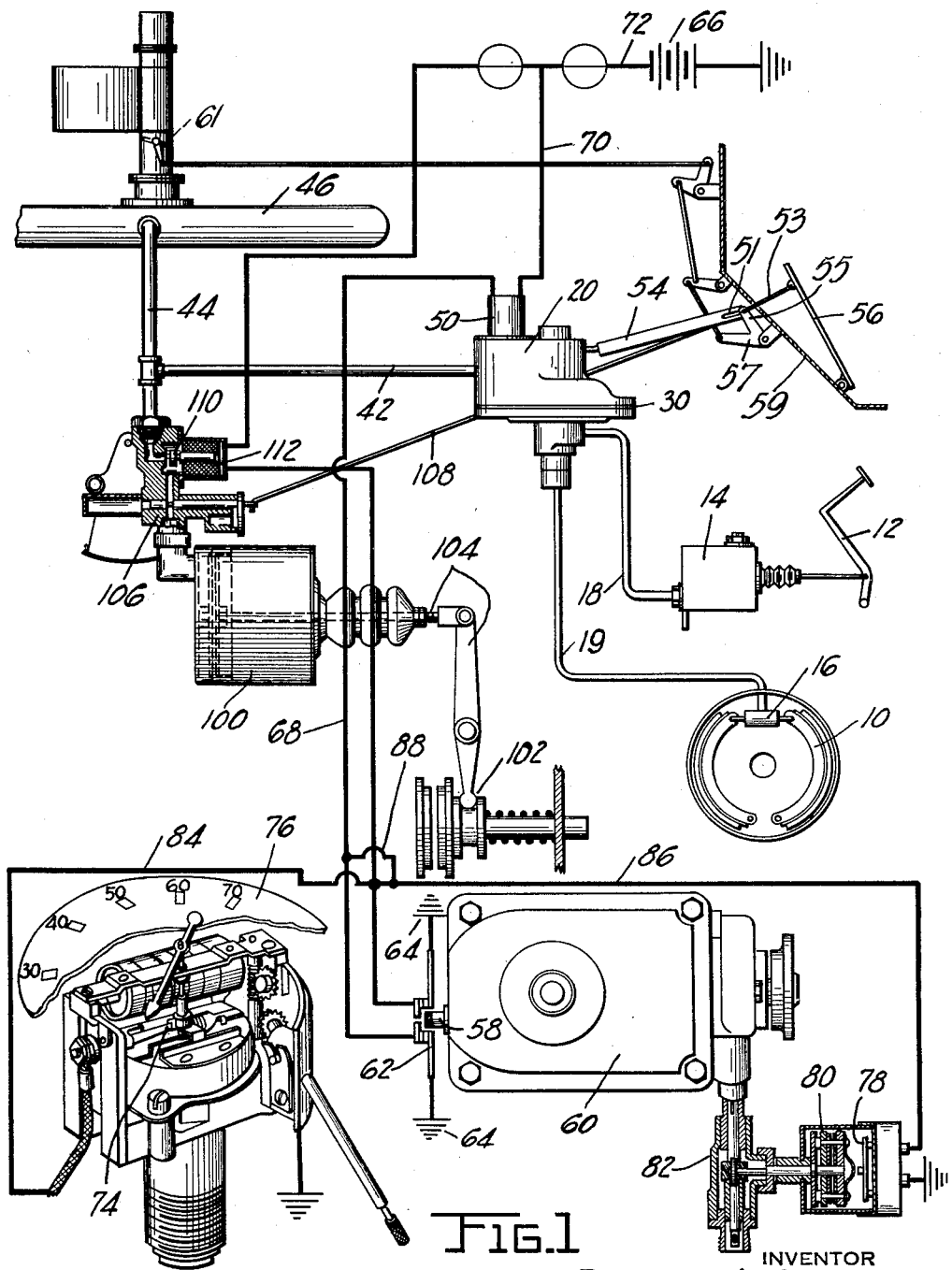

Patented Apr. 16, 1940

2,197,721

UNITED STATES PATENT OFFICE 2,197,721

TRANSMISSION AND CLUTCH CONTROL

Rudolph A. Goepfrich, South Bend, Ind.

Application October 1, 1937, Serial No. 166,737

5 Claims. (Cl. 192—.01)

This invention relates in general to the braking mechanism of automotive vehicles and in particular to means for controlling such mechanism commonly known to those skilled in this art as a "no-back" or "no-roll" device.

It is the principal purpose of the invention to provide a no-back mechanism in combination with the so-called automatic clutch, that is power means automatically operable, when the accelerator is released, to disengage the clutch.

To this end there is disclosed in the preferred embodiment of the invention a vacuum operated motor for operating the clutch, said motor being automatically operative to disengage the clutch when the accelerator is released and either the transmission is in any position except high gear or the transmission is in high gear and the speed of the vehicle is at or below a predetermined factor. Together with this clutch control mechanism there is provided power means automatically operated when and if the clutch is disengaged to insure an application of the brakes, once applied, so long as the accelerator remains released to disengage the clutch.

Yet another object of the invention is to provide interlocked electro-pneumatically operated means for operating the clutch and brakes of an automotive vehicle, the clutch and brake operating means being so constructed and arranged that the accelerator, in part, controls said means.

A further object of the invention is to provide means operable to maintain the brakes of an automotive vehicle applied so long as the accelerator remains released.

Yet another object of the invention is to provide means for insuring an application of the brakes of an automotive vehicle so long as the accelerator remains released and the transmission of the vehicle is in any of its several positions, e. g. low, second or neutral gear, with the exception of its high gear position.

The invention also contemplates the provision of a no-back mechanism for a hydraulically operated brake mechanism, said mechanisms being controlled in part by the accelerator and/or the transmission and/or the speedometer.

Other objects of the invention and desirable details of construction and combinations of parts will become apparent from the following description of a preferred embodiment, which description is taken in conjunction with the accompanying drawings, in which:

Figure 1 is a diagrammatic view disclosing the principal elements of the brake and clutch controlling mechanism constituting my invention;

Figure 2 is a sectional view disclosing in detail the no-back device of the brake operated mechanism disclosed in Figure 1; and Figure 3 is a view disclosing in detail the linkage interconnecting the accelerator, throttle and control valves of the clutch operating power means.

In that embodiment of the invention disclosed in Figure 1, a conventional two-shoe type of wheel brake 10 is operated by a hydraulic mechanism of conventional design, including a manually operable brake pedal 12 operably connected to a so-called master cylinder 14, the latter being placed in fluid transmitting connection with a brake shoe operating wheel cylinder 16 by means of conduits 18 and 19.

The invention disclosed in Figure 1 is directed to a so-called no-back mechanism for insuring an application of the brakes, once applied, after the accelerator of the vehicle is released and either the transmission is in any position except high gear or the transmission is in high gear and the speed of the vehicle is at or below a predetermined factor. The no-back mechanism is housed as a unit by a casing 20 and, as disclosed in detail in Figure 2, comprises a spring loaded ball check valve 22 adapted, when a bayonet plunger 24 is moved upwardly, to seat at 26. The plunger 24 is moved to this position by means of a diaphragm 28 of a pressure differential operated motor 30, the upper chamber 32 of the motor being connected, via ports 34, 36, 38 and 40 and conduits 42 and 44, with the intake manifold 46 of the internal-combustion engine of the vehicle.

There is thus provided a source of vacuum to energize the check valve operating motor 30. The motor is controlled by two valves, including a two-way cut-out valve 48 operated by a solenoid 50 and a three-way valve 52 operated, through the intermediary of a link 54, by the engine controlling accelerator 56 of the vehicle. As disclosed in Figure 3, the link 54 is slotted at 51 to receive the end of the accelerator rod 53. Rod 53 has also attached thereto an arm 55 of a bell crank lever 57 pivotally secured to the floorboard 59. The accelerator is connected, by the linkage disclosed, to a throttle 61. The solenoid 50 is in part controlled by means of the high and second gear shift rail 58 of the vehicle's three-speeds forward and reverse transmission 60, said rail serving to open a switch 62 only when the transmission is in high gear. The switch 62 is grounded at 64 and wired to a battery 66 by means of leads 68, 70 and 72. The solenoid 50 is furthermore controlled by means of a switch 74 housed within the speedometer 76 of the vehicle and a switch 78 operated by a governor 80, the latter being operated by the speedometer drive 82.

Describing now the operation of the no-back mechanism, upon release of the accelerator 56, the three-way valve 52 is actuated to in part open up the fluid transmitting connection between the motor 30 and the intake manifold 46. If at this time the transmission is in any of its positions except high gear, the switch 62 is closed, thus energizing the solenoid 50 to open the cut-out valve 48; or if the transmission is in high gear and the speed of the vehicle is at or below a predetermined factor, the solenoid 50 will, by virtue of the closing of either the switch 78 or the speedometer operated switch 74 be energized to open the valve 48. The motor 30 is thus energized by partially evacuating the chamber 32, the atmosphere, vented to a chamber 90 by means of port 92, serving to move the diaphragm 28 upwardly against the action of a return spring 94 to permit a spring 96 to seat the ball check valve 22. Should the brake now be applied by means of the pedal 12, the brake, by virtue of the action of the check valve, will remain applied until the motor 30 is deenergized by depressing the accelerator to close the three-way valve 52. In this action, the chamber 32 is vented to the atmosphere via a port 98 of the three-way valve.

There is thus provided means automatically operative to hold the car in fixed position, once brought to a standstill, so long as the accelerator remains in its released position and the engine is idling to provide a source of vacuum to energize the motor 30. After stopping the car on an incline, the clutch being disengaged at the time, the driver may remove his right foot from the brake pedal and transfer it to the accelerator to again place the car in motion, without the risk of having the car move backwardly. Furthermore, with the above-described mechanism with the transmission in high gear and the speed of the vehicle above a predetermined factor, the brake may be gradually applied and gradually released to control the speed of the vehicle, unaffected by the release of the accelerator.

Describing now one of the most important features of my invention, as clearly disclosed in Figure 1, there is interlocked with the above-described no-back mechanism power means for operating the clutch. Referring to Figure 1, a clutch motor 100, operably connected to the clutch 102 by means of linkage 104, is controlled by means of a three-way valve 106 operated by accelerator 56 through the intermediary of a link 108. As disclosed in Figure 3, the link 108 is slotted at its end to provide a lost motion connection with the accelerator rod 53. A two-way cut-out valve 110 serves to control the connection between the manifold 46 and the clutch motor 100. A solenoid 112, functioning to operate the valve 110, is controlled by any one of (1) the high and second gear shift rail operated switch 62, (2) the speedometer operated switch 74, and (3) the governor operated switch 78.

Describing the operation of the clutch control mechanism, upon release of the accelerator, the valve 106 is operated to interconnect the manifold with the motor 100 to energize the same and effect a disengagement of the clutch. However, this action takes place only if the cut-out valve 110 is operated by any one of the aforementioned switches to open the connection between the valve 106 and the manifold. No claim is made herein to the above-described clutch mechanism, inasmuch as the same constitutes the invention of Harold W. Price and Earl R. Price, disclosed and claimed in their application Serial No. 166,296, filed September 29, 1937.

However, it is to be particularly noted that, as disclosed in Figure 1, both the motors 30 and 100 and the solenoids 50 and 112 are interlocked to provide a simple and compact mechanism for automatically disengaging the clutch and rendering operative the no-back mechanism upon release of the accelerator.

While one illustrative embodiment has been described, it is not my intention to limit the scope of the invention to that particular embodiment, or otherwise than by the terms of the appended claims.

I claim:

1. The combination with the accelerator clutch and brakes of an automotive vehicle of power means for operating the clutch, means for operating the brakes, and means, controlled in part by the accelerator, for insuring an application of the brakes, once applied, so long as the accelerator remains in its released position, and transmission means for in part controlling the clutch operating power means, said transmission means serving to in part control the operation of the means for insuring an application of the brakes.

2. The combination with the clutch, brakes and transmission of an automotive vehicle, electropneumatic power means for operating the clutch, means for operating the brakes, and switch means, operative by the transmission, for in part controlling the operation of both the brake and the clutch operating means.

3. In an automotive vehicle provided with a clutch, brakes, a speedometer and a transmission, power means for operating the clutch, means for operating the brakes, and means, operated by either the transmission or the speedometer, for in part controlling the operation of both the brake and the clutch operating means.

4. In an automotive vehicle provided with a clutch, brakes and an intake manifold, a manifold vacuum operated power means for operating the clutch, means for operating the brakes including a check valve, and other manifold vacuum operated power means interlocked with the aforementioned power means for in part controlling the operation of the check valve and thus controlling the operation of the brake operating means.

5. The combination with the brakes and transmission of an automotive vehicle, means for operating the brakes, electro-pneumatic power means for in part controlling the operation of said brake operating means, and switch means operated by the transmission for in part controlling the operation of the brake operating means.

RUDOLPH A. GOEPFRICH.